Aug. 25, 1931.    R. H. ANDERSON    1,820,294
JIG SAW
Filed Aug. 20, 1929    2 Sheets-Sheet 1
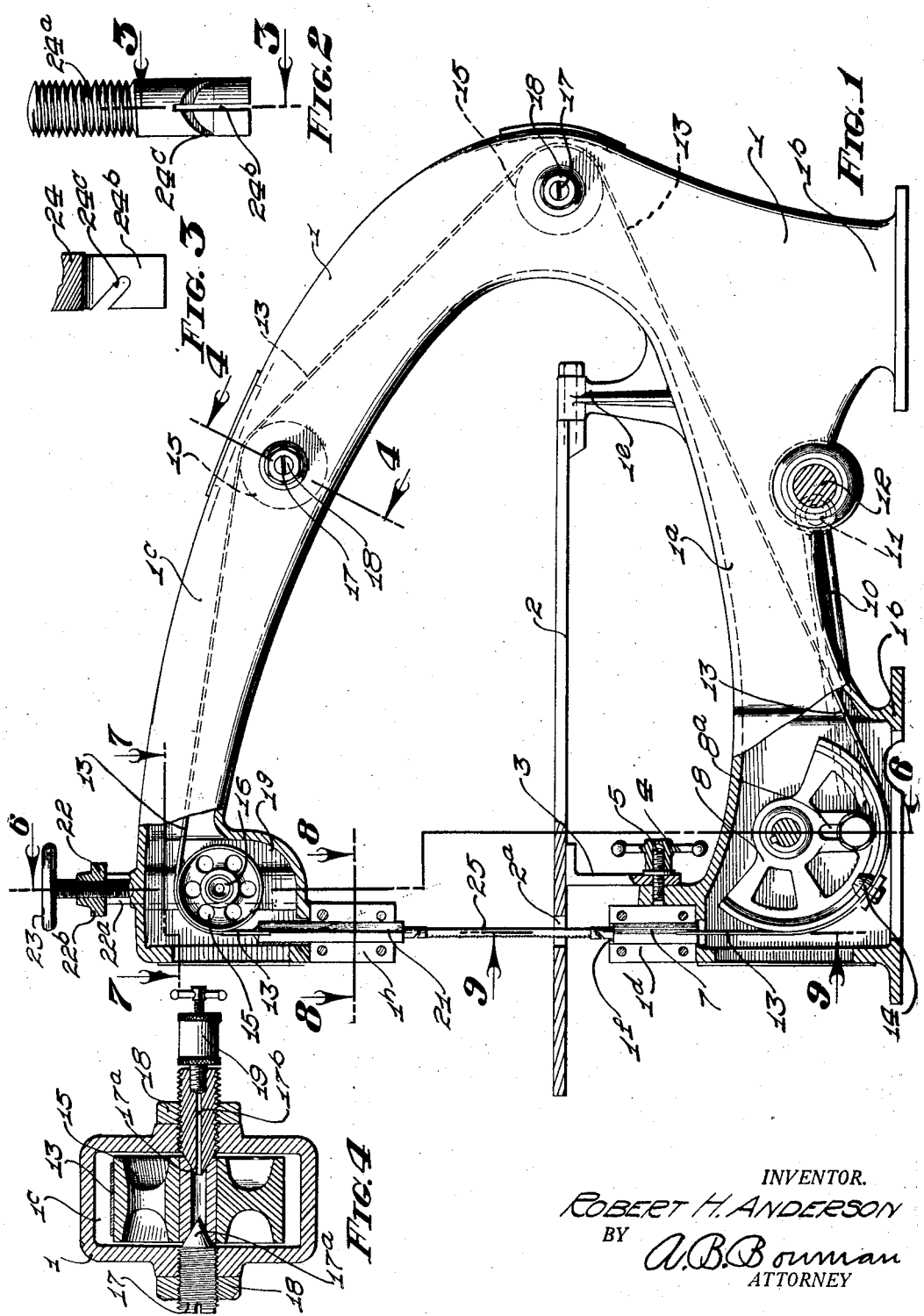
INVENTOR.
ROBERT H. ANDERSON
BY A.B. Bowman
ATTORNEY Aug. 25, 1931. R. H. ANDERSON 1,820,294
JIG SAW
Filed Aug. 20, 1929 2 Sheets-Sheet 2
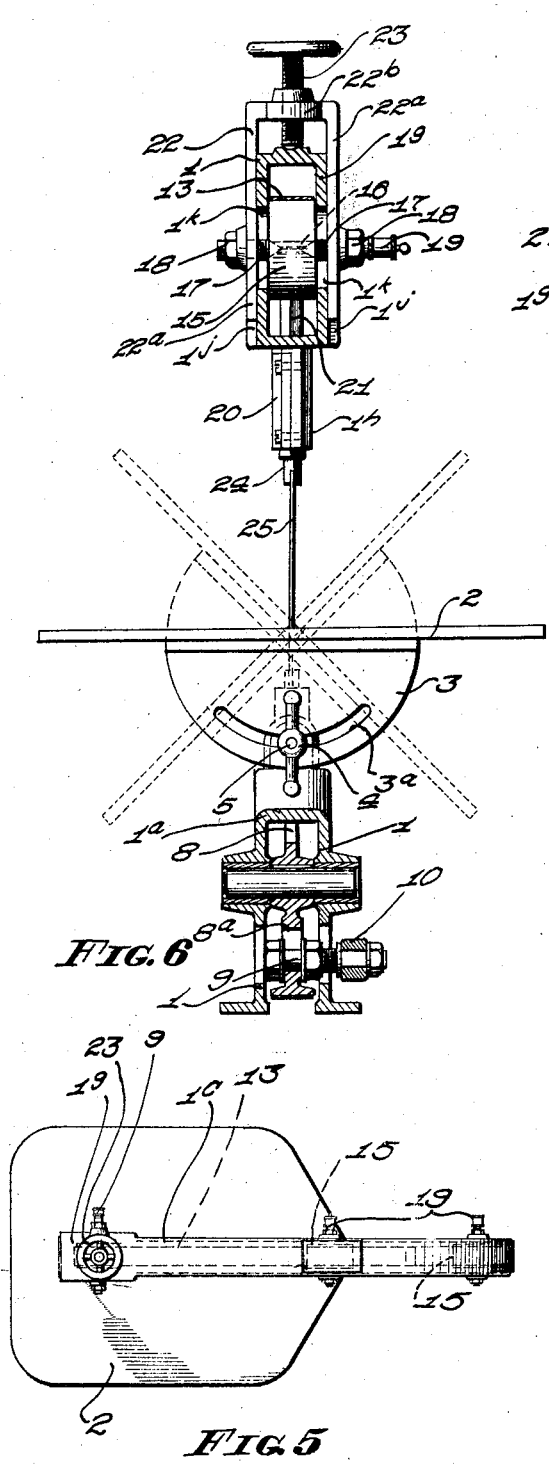
FIG. 6
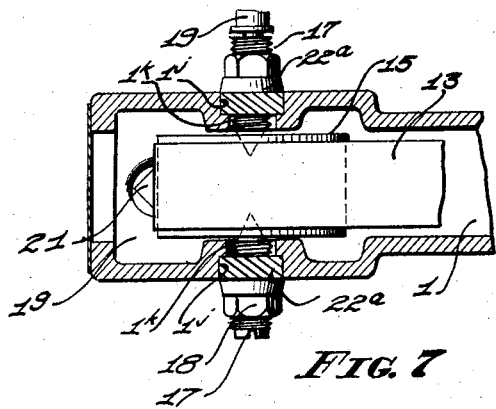
FIG. 7
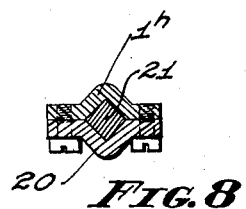
FIG. 8
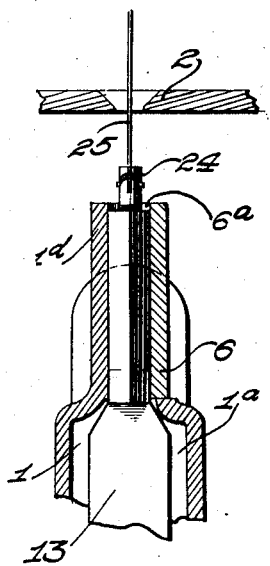
FIG. 9
FIG. 5
INVENTOR.
ROBERT H. ANDERSON
BY
A. B. Bowman
ATTORNEY Patented Aug. 25, 1931

1,820,294

UNITED STATES PATENT OFFICE

ROBERT H. ANDERSON, OF SAN DIEGO, CALIFORNIA, ASSIGNOR OF ONE-HALF TO A. B. BOWMAN, OF SAN DIEGO, CALIFORNIA

JIG SAW

Application filed August 20, 1929. Serial No. 387,211.

My invention relates to jig saws, and the objects of my invention are: first, to provide a jig saw which is capable of traveling at high speed with little or no vibration; second, to provide a jig saw which combines the advantages of a hand saw with those of a conventional jig saw; third, to provide a jig saw in which all movement except the desired reciprocal movement of the saw blade is entirely eliminated; fourth, to provide a jig saw in which practically all other parts except the blade itself are concealed; fifth, to provide a jig saw which may use a relatively small blade and therefore is capable of performing intricate scroll work or the like; sixth, to provide a jig saw, the blade of which is readily removable; seventh, to provide a jig saw in which the jerking at the ends of the saw stroke is reduced to a minimum; eighth, to provide a jig saw which may be readily operated by an inexperienced person; and ninth, to provide on the whole a novelly constructed jig saw which is extremely simple of construction proportional to its functions, durable, efficient in its actions, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my jig saw, with parts and portions broken away and in section to facilitate the illustration; Fig. 2 is an enlarged elevational view of one of the saw supporting members; Fig. 3 is an enlarged fragmentary sectional view thereof through 3—3 of Fig. 2; Fig. 4 is a transverse sectional view through 4—4 of Fig. 1; Fig. 5 is a reduced top or plan view of my jig saw; Fig. 6 is a sectional view thereof through 6—6 of Fig. 1 with parts and portions shown in elevation to facilitate the illustration; Fig. 7 is an enlarged, fragmentary sectional view through 7—7 of Fig. 1; Fig. 8 is another sectional view through 8—8 of Fig. 1; and Fig. 9 is a fragmentary sectional view through 9—9 of Fig. 1.

Similar characters of reference refer to similar parts and portions throughout the several views of the drawings.

Frame 1, table 2, bracket 3, hand nut 4, stud bolt 5, guide member 6, slide member 7, driving wheel 8, journal pin 9, connecting rod 10, crank pin 11, drive shaft 12, band 13, clamp 14, idler rollers 15, bushings 16, journaling screws 17, lock nuts 18, lubricating members 19, guide member 20, sliding member 21, yoke member 22, tension screw 23, stud screws 24, and saw blade 25 constitute the principal parts and portions of my jig saw.

A frame 1 is provided which comprises a hollow base portion 1a supported by feet portions 1b, and an arm portion 1c which extends upwardly from the rear end of the base portion and forwardly over said base portion, as shown best in Fig. 1. At the forward end of the base portion 1a is an upwardly extending portion 1d.

A short distance above the base member portion 1a is mounted a table member 2. The table 2 is rotatably mounted at its rear end on a stud supported by a pedestal 1e extending upwardly from the base portion 1a just forwardly of the juncture of the arm 1c therewith. The table 2 is supported at its forward end by a bracket 3 which extends downwardly therefrom and is adapted to be clamped against the rear side of the upwardly projecting portion 1d. As shown in Fig. 6, the bracket 3 its provided with an arcuately extending slot 3a near its lower margin, through which extends a bolt 5. A hand nut 4 is adapted to clamp against the bracket 3 and hold the table 2 in any desired tilted position, as indicated by the dotted lines in Fig. 6.

Just forwardly of the bracket 3 the upwardly extending portion 1d is cut back until its one side face is substantially flush with a vertical plane bisecting the frame 1.

A vertically extending channel 1f is formed in this face. A guide member is adapted to fit against this face, and is provided with a vertically extending channel 6a therein which complements the channel 1f and forms a polygonal shaped guide or sleeve for a sliding member 7. The sliding member 7 is adapted to reciprocate in a vertical plane within the guide thus formed, but is prevented from turning relative thereto.

Journaled within the base portion 1a, between the side walls thereof, is a segmental driving wheel 8, which is so positioned that its forward side is approximately tangent with the continuation of the axis of the slide member 7. The driving wheel 8 is provided with a slot 8a which extends radially intermediate the hub and rim. The one end of a journal pin 9 extends through the slot 8a and is adjustably secured to the driving wheel by lock nuts which clamp the margins of the slot 8a. Rotatably connected to the journal pin 9 is a connecting rod 10. The other end of said rod is connected to a crank pin 11 which is in turn connected with the driving shaft 12, journaled in the under side of the base portion 1a rearwardly of the driving wheel 8. Rotation of the drive shaft 12 causes an oscillating movement of the wheel 8.

Secured to the lower end of the slide member 7 is a band 13 which extends part way around the wheel 8 and rearwardly therefrom within the base member 1a and towards the rear upper portion thereof, then forwardly through the arm member 1c. The band 13 is secured relative to the wheel 8 by a clamp member 14 so as to prevent creeping.

The band 13 is held away from the walls of the arm 1b, and the base portion 1a by idler rollers 15, which are suitably located within the arm 1c, and also at approximately the juncture of said arm with the base member 1a. Each idler roller 15 is provided with a bushing 16, the ends of which are journaled on cone-shaped end portions 17a of journaling screws 17 which are screwably mounted in the side walls of the arm 1c, and are adapted to be locked in any desired position by means of lock nuts 18. Certain of the journaling screws 17 are provided with longitudinally extending bores 17b therethrough which connect at the outer end of the journaling screw with a lubricating means 19, as shown best in Fig. 4.

At the extended forward end of the arm 1c there is provided an enlarged head portion 1g. The head 1g is provided at its forward lower side with a depending portion 1h, the one face of which is cut back to the vertical median line of the frame and is in vertical alinement with the upwardly extending portion 1d.

The depending portion 1h is provided with a guide member 20 which fits thereover. Centered between the guide member 20 and the depending portion 1h, there is formed a polygonal shaped sleeve, in which is adapted to reciprocate a sliding member 21, which is in vertical alinement with the sliding member 7. The sliding member 21 is made polygonal in cross section so as not to rotate in its guide.

The other end of the band 13 is secured to the upper end of the slide member 21. Within the head portion 1g, the band 13 passes over one of the idler pulleys 15, the forward surface of which is substantially tangent to the median line of the slide member 21.

The idler pulley 15 mounted in the head 1g of the arm is not secured directly to the arm, but is supported in a yoke member 22, which is substantially U-shaped, with the legs thereof extending downwardly along the sides of the head 1g in channels 1j formed therein. The journaling screws 17 of this particular idler pulley 15 are screwably mounted in the legs 22a of the yoke member 22. The journaling screws extend inwardly therefrom through slots 1k registering with the channels 1j and extend into opposite sides of the bushing within said idler pulleys 15.

The cross portion 22b of the yoke member 22 extends across the upper side of the head 1g. A screw member 23 is mounted in the cross portion 22c and extends downwardly therefrom so as to engage the upper side of the head 1g. The screw member 23 tends to lift the idler pulley 15 supported by the yoke while the band 13 formed around the idler pulley tends to shift said pulley to its lowered position against the action of the screws 23. Thus, the yoke 22 and the idler pulley supported thereby comprise a tension means for the band 13.

Secured into the lower end of the sliding member 21 is a saw-supporting stud member 24, which is threaded at its upper portion 24a and provided with a slit 24b extending longitudinally inward from its lower end. The slit 24b is intersected by a slot 24c which extends inwardly and downwardly at right angles to the slit 24b, as shown best in Figs. 2 and 3.

A similar saw-supporting stud 24 is secured in the upper side of the sliding member 7. Supported between these two studs is a saw blade 25, which extends through a slot 2a provided in the table 2. By releasing the tension of the idler pulley supported by the yoke 22, the saw blade 25 may be easily removed from said supporting studs 24 for replacement or the like.

The operation of my jig saw is as follows: Rotation of the shaft 12 by any means, not shown, such as a motor, causes a reciprocal movement of the driving wheel 8, and consequently, a reciprocating movement of the band 13, the slide members 7 and 21, and the saw 25. By reason of the slide members 7 and 21, the saw member 25 can only reciprocate.

By adjusting the position of the journal pin 9 relative to the axis of the wheel 8, the length of the stroke of the saw blade may be regulated. Furthermore, by reason of the tension constantly applied at both ends of the saw blade which is not released at the end of the stroke, the saw blade may be driven at a high speed.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a sawing machine of the class described, a frame comprising a base and an arm extending thereover, guide means portions at the extended portion of said arm and at the corresponding portion of said base, said portions having V grooves formed therein, substantially square slide members mounted in said V grooves and V formed plates detachably secured to said guide portions and over said slide members, idler pulleys supported by said arm and said base, a band extending around said idler pulleys and secured to said slide members, a saw connecting said slide members, and a means for causing reciprocal movement of said band and saw.

2. In a jig saw, a substantially semi-elliptical hollow frame, the one leg thereof forming a substantially horizontally disposed base portion, pulleys mounted within said frame, including a pulley within each end of said frame, a band extending over said pulleys within said frame, a saw blade extending between the ends of said frame and secured to the ends of said band, and means for reciprocating said band.

3. In a jig saw, a substantially semi-elliptical hollow frame, the one leg thereof forming a substantially horizontal base, an enlarged head portion formed at the end of the other leg and provided with a pair of oppositely disposed perpendicular channels in the sidewalls thereof, a slot extending through said sidewalls in said channels, a yoke slidably mounted in said channels, a pulley positioned within said head portion, pivot means for said pulley extending through said slots and supported on said yoke, means for adjusting the position of said yoke, other pulleys mounted within said frame including a pulley at the opposite end, a band extending through said frame over said pulleys, a saw blade connected between the ends of said band and means for reciprocating said band.

4. A jig saw, as set forth in claim 3 including a screw through said yoke bearing on the upper side of said head portion substantially intermediate said channels for shifting said yoke and therewith associated pulley upwardly and thereby tensioning said blade.

5. In a jig saw, a hollow frame provided with vertically disposed ends, pulleys mounted within said frame including a pulley within each end of said frame, a band extending over said pulleys within said frame, a saw blade extending between the ends of said frame and secured to the ends of said band, and means for reciprocating said band.

6. In a jig saw, a hollow frame provided with vertically disposed ends, pulleys mounted within said frame including a pulley within each end of said frame, means for shifting the position of one of said pulleys in the end of said frame, a band extending over said pulleys within said frame, a saw blade extending between the ends of said frame and secured to the end of said band, and means for reciprocating said band.

In testimony whereof, I have hereunto set my hand at San Diego, California this 7th day of August, 1929.

ROBERT H. ANDERSON.